(12) United States Patent
Starek (10) Patent No.: US 12,261,524 B2
(45) Date of Patent: Mar. 25, 2025

(54) SYSTEMS AND METHODS FOR ADAPTIVE POWER CONVERTERS

(71) Applicant: Outdoor Wireless Networks LLC, Claremont, NC (US)

(72) Inventor: Peter Starek, Donauwoerth (DE)

(73) Assignee: Outdoor Wireless Technologies LLC, Claremont, NC (US)

( * ) Notice: Subject to any disclaimer, the term of this patent is extended or adjusted under 35 U.S.C. 154(b) by 0 days.

(21) Appl. No.: 18/261,080

(22) PCT Filed: Jan. 11, 2022

(86) PCT No.: PCT/US2022/012027
§ 371 (c)(1),
(2) Date: Jul. 11, 2023

(87) PCT Pub. No.: WO2022/150778
PCT Pub. Date: Jul. 14, 2022

(65) Prior Publication Data
US 2024/0063713 A1    Feb. 22, 2024

Related U.S. Application Data (60) Provisional application No. 63/135,886, filed on Jan. 11, 2021.

(51) Int. Cl.
*H02M 3/04* (2006.01)
(52) U.S. Cl.
CPC .................................. *H02M 3/04* (2013.01)
(58) Field of Classification Search
CPC .......... H02M 3/04; H02M 1/36; H02M 3/155; H02M 1/10
See application file for complete search history.

(56) References Cited

U.S. PATENT DOCUMENTS

2004/0061380 A1*  4/2004  Hann ...................... H02J 1/102
                                                                 307/43
2016/0036536 A1    2/2016  Brower et al.
(Continued)

FOREIGN PATENT DOCUMENTS

EP           3614548 A1     2/2020

OTHER PUBLICATIONS

International Searching Authority, "International Search Report and Written Opinion", from PCT Application No. PCT/US2022/012027, Apr. 28, 2022, pp. 1 through 10, Published in: KR.

*Primary Examiner* — Daniel Cavallari
(74) *Attorney, Agent, or Firm* — Fogg & Powers LLC (57) ABSTRACT

Systems and methods for adaptive power converters are provided. In one embodiment, an adaptive power converter comprises: a power converter controller; a switching power conversion circuit comprising an input switch, a low-pass filter, and a non-linear control feedback compensator, the input switch controlled using feedback control from the non-linear control feedback compensator, wherein the non-linear control feedback compensator controls the input switch to regulate an output from the power conversion circuit based on multiple regulation profiles; a measurement estimate and gain module; and a power converter state detection and correction function. The measurement estimate and gain module evaluates power converter state information from the power converter state detection and correction function. Based on the power converter state information, the measurement estimate and gain module controls the compensator to select a regulation profile, wherein the non-linear control feedback compensator applies the regulation profile for regulating the output from the conversion circuit.

26 Claims, 4 Drawing Sheets

(56) References Cited

U.S. PATENT DOCUMENTS

2017/0237349 A1    8/2017   Labib et al.
2019/0074694 A1    3/2019   Matan et al.

\* cited by examiner

SYSTEMS AND METHODS FOR ADAPTIVE POWER CONVERTERS

CROSS-REFERENCE TO RELATED APPLICATIONS

This application is a 371 National Stage Application of PCT Application No. PCT/US2022/012027, filed on Jan. 11, 2022, which claims the benefit of U.S. Provisional Application Ser. No. 63/135,886, filed Jan. 11, 2021, and titled "SYSTEMS AND METHODS FOR ADAPTIVE POWER CONVERTERS," both of which are hereby incorporated herein by reference.

BACKGROUND

Switching power converters, such as DC-to-DC and AC-to-DC power converters, are ubiquitous in many electronic and electrical devices to provide a source of power at a stable voltage level for powering the devices. Such power converters in use today primarily utilize linear feedback control mechanisms that are tuned to operate at an optimal efficiency in the proximity of a calibration point corresponding to a desired operating voltage. For example, a power converter that powers a 48-volt system would have a control algorithm that drives the switching function of the power converter to maintain a nominal 48-volt output to its powered loads across a range of output power needed to satisfy demands from those loads. Power converter efficiency becomes sub optimal if the power converter is set to operate at another operating voltage. Moreover, the control algorithm cannot adequately react to changing conditions at the connected load better addressed by actions other than maintaining its output at the nominal voltage rating.

SUMMARY

The Embodiments of the present disclosure provide methods and systems for adaptive power converters and will be understood by reading and studying the following specification.

In one embodiment, an adaptive power converter comprises: a power converter controller; a switching power conversion circuit comprising an input switch, a low-pass filter, and a non-linear control feedback compensator executed by the power converter controller, wherein the input switch is controlled using feedback control from a non-linear control feedback compensator, wherein the non-linear control feedback compensator controls the input switch to regulate an output from the switching power conversion circuit based on a plurality of regulation profiles; a measurement estimate and gain module executed by the power converter controller; and a power converter state detection and correction function executed by the power converter controller; wherein the measurement estimate and gain module is configured to evaluate power converter state information from the power converter state detection and correction function; and wherein based on the power converter state information, the measurement estimate and gain module controls the non-linear control feedback compensator to select a first regulation profile from the plurality of regulation profiles, wherein the non-linear feedback compensator applies the first regulation profile for regulating the output from the switching power conversion circuit.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

One or more embodiments described in the present disclosure present systems, devices, and methods for adaptive power converters and corresponding adaptive power consumers. In some embodiments, systems are provided wherein an adaptive power converter and an adaptive power consumer establish bidirectional communication and utilize the exchange of state detection and state correction information (referred to collectively herein as state information) to facilitate power supply management and also evaluate the health of the adaptive power converters and/or corresponding adaptive power consumers. State information comprises any information that characterizes aspects of the operation of equipment or environmental conditions that may affect the operation of equipment. For example, equipment or ambient room temperatures, equipment component status or configuration information, sensor measurements, electrical currents, voltages, power levels, currently applied settings or setpoints, fan rotation speeds, adjustable amplifier gains, and switch states are all non-limiting examples of parameters that may be represented by state information. One or more of the embodiments disclosed herein thus provide flexibility in the manner in which the power converters and power consumers can adjust to changing operating conditions. As further detailed below, embodiments of the present disclosure, therefore, may be utilized to implement both adaptive power supply management features and health monitoring features not available with standard power converters.

Figure 1:
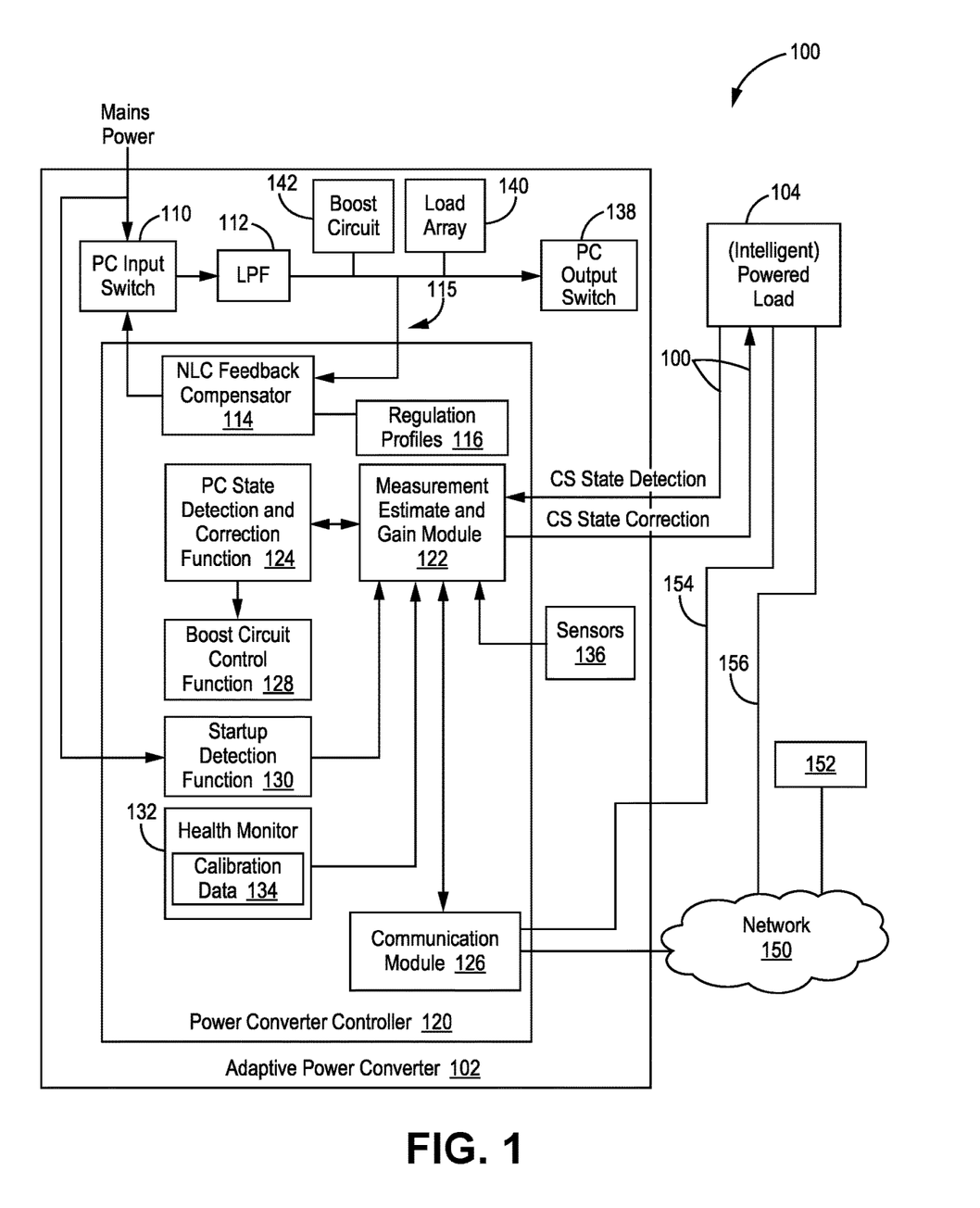
FIG. 1 is a block diagram of an example power distribution system embodiment comprising an adaptive power converter.

FIG. 1 is a block diagram illustrating a power distribution system 100 comprising an example adaptive power converter 102 coupled to an adaptive power consumer system which is referred to herein as an intelligent powered load 104. The type and purpose of the intelligent powered load 104 are not limited and may comprise any device configured to receive its power from a regulated power source. For example, in some embodiments, the intelligent powered load 104 may comprise one or more elements of a distributed antenna system (DAS), a network device of a network in a data center or office facility, network servers, facility control or monitoring systems, or other electrical power-consuming devices or systems. In some embodiments, the adaptive power converter 102 and intelligent powered load 104 may both comprise components integrated within a common device. For example, the adaptive power converter 102 may comprise a power supply within a radio frequency (RF) transceiver, and the intelligent powered load 104 may comprise a logic board, power amplifier, or other component or set of components within the RF transceiver. It should also be understood that the adaptive power converter 102 is not limited to only being used to supply power to intelligent powered loads. That is, in other embodiments, powered loads fed from the adaptive power converter 102 may comprise standard powered load devices that do not communicate state information with the adaptive power converter 102.

In FIG. 1, the adaptive power converter 102 comprises a power converter input switch 110 coupled to a mains electric power source (such as a general-purpose feed from an electric power utility, local power grid, generator, battery bank, or the like) referred to herein as "mains power." As the term is used herein, mains power can supply either an alternating current (AC) or direct-current (DC) power to the power converter input switch 110 of the adaptive power converter 102. The power converter input switch 110 may comprise either mechanical switching or solid-state switching (e.g., using switching transistors). The power converter input switch 110 outputs the power it receives to a low-pass filter 112 and is controlled to switch the flow of power to the low-pass filter 112 on and off. The low-pass filter 112 outputs a nominal electrical power output signal, the electrical power output having a nominal DC voltage component and AC ripple component that are functions of both the switching frequency and the relative duration of the respective on and off cycles. The switching of the power converter input switch 110 is controlled by a feedback control loop comprising a non-linear control feedback compensator 114. Details of the non-linear control features of the non-linear control feedback compensator 114 are discussed in greater detail below. This closed-loop arrangement of the power converter input switch 110, the low-pass filter 112, and the non-linear control feedback compensator 114 defines a switching power conversion circuit 115 of the adaptive power converter 102.

In general, the non-linear control feedback compensator 114 monitors the output voltage signal from the low-pass filter 112 and controls the power converter input switch 110 to regulate the output voltage signal based on a regulation profile 116. In some embodiments, the non-linear control feedback compensator 114 is executed by a power converter controller 120. The power converter controller 120 may comprise a processor and memory and be programmed to execute code for implementing any of the functions of the various elements of the power converter controller 120 discussed herein. In some embodiments, the memory stores one or more of the regulation profiles 116 utilized by the non-linear control feedback compensator 114. In some embodiments, the power converter controller 120 comprises a state machine for implementing the non-linear control feedback compensator 114 that directly generates and provides switching control signals to the power converter input switch 110.

It should be appreciated by those with knowledge of non-linear control systems that utilization of a non-linear control feedback compensator 114 utilizing non-linear control extensions provides the adaptive power converter 102 the ability to select from a plurality of optimized non-linear regulation profiles 116 having responsiveness and robustness across a range of different output voltage setpoints (in contrast to traditional power converters that are optimal for a single operating point, such as proportional-integral-derivative (PID) controllers). That is, the non-linear control feedback compensator 114 is dynamically re-programmable in that it can dynamically load and execute one of the plurality of regulation profiles 116 to implement non-linear extensions for different regulation schemes. Utilizing the selected regulation profile, the adaptive power converter 102 regulates its output optimally even when the output voltage setpoint is varied from the nominal output voltage to any other voltage level. Moreover, in some embodiments, the non-linear control feedback compensator 114 is configured to provide an output signal that drives the power controller (PC) input switch 110 to produce switching cycle generation as would be produced by a pulse-width-modulation generator. As there would be no need for external pulse-width-modulation generator hardware circuitry, in this case, using the PC input switch 110 to produce switching cycle generation would save cost and reduce the footprint for board space.

As shown in FIG. 1, the power converter controller 120 of the adaptive power converter 102 further executes functions referred to herein as the measurement estimate and gain module 122 and the power converter state detection and correction function 124. In some embodiments, utilizing state information exchanged with power converter state detection and correction function 124 and/or with the intelligent powered load 104, the measurement estimate and gain module 122 may introduce a policy change that reconfigures the regulation scheme used by the adaptive power converter 102 to supply power to the intelligent powered load 104. That is, the measurement estimate and gain module 122 can quickly gather information about the adaptive power converter 102 and/or intelligent powered load 104 through state detection and make changes to the system conditions through PC state corrections and consumer system (CS) state corrections, according to the desired regulation policy, or use state detection to derive measures that reflect the health condition of the system 100 and/or one or more components thereof. In some embodiments, as an alternative method for obtaining electric current measurement, internal state changes generated in the power converter state detection and correction function 124 in their temporal sequence may be used for indirect electric current measures. In other embodiments, the power converter controller 120 may implement other functions as shown in FIG. 1, such as one or more of a communication module 126, a boost circuit control function 128, a startup detection function 130, a health monitor function 132, a power converter output switch 138, each of which is in turn discussed below.

As shown in FIG. 1, the measurement estimate and gain module 122 assumes a central role in the operation of the adaptive power converter 102 and collects state information from the adaptive power converter 102 and/or intelligent powered load 104, and in some embodiments from one or more of the startup detection function 130, health monitor function 132, one or more physical sensors 136, or the communication module 126. Based on evaluating the state information and collected data, the measurement estimate and gain module 122 may initiate appropriate corrective actions such as, but not limited to, changing regulation or control schemes of the adaptive power converter 102 and/or intelligent powered load 104, conducting health condition estimates, controlling the output switch 138 or forwarding/receiving other information via the communication module 126.

In some embodiments, the measurement estimate and gain module 122 facilitates adaptive power supply management through intelligent interactions between adaptive power converter 102 and the intelligent powered load 104. In some embodiments, the intelligent powered load 104 may communicate status information (e.g., state detection) to the adaptive power converter 102, indicating its power needs so that the measurement estimate and gain module 122 can determine the desired output power regulation scheme and, if needed, initiate a policy change in the output power regulation scheme. For example, in one embodiment, the intelligent powered load 104 may determine that it needs to initiate a process or change a configuration that requires more power than it is currently drawing. The need for more power may be indicated by a change to state information and communicated from the intelligent powered load 104 to the measurement estimate and gain module 122 via consumer system (CS) state detection input to the measurement estimate and gain module 122. In response, the measurement estimate and gain module 122 can switch the adaptive power converter 102 to execute a new regulation profile 116 that lifts the voltage output of the adaptive power converter 102 to a new level that corresponds to the increase in power consumption by the intelligent powered load 104. In one embodiment, the measurement estimate and gain module 122 communicates the regulation scheme change to the power converter state detection and correction function 124 (via a PC state correction instruction), which in turn outputs an instruction to the non-linear control feedback compensator 114 to select and execute a new regulation profile 116 that corresponds to the increased voltage level. Conversely, the intelligent powered load 104 may communicate a need for less power. The measurement estimate and gain module 122 detects that need via the CS state detection and instructs the power converter state detection and correction function 124 to select a regulation profile 116 that lowers the voltage output of the adaptive power converter 102. In this way, adaptive power converter 102 can adapt to the power consumption needs of the intelligent powered load 104 while still maintaining operation with optimal efficiency at the new setpoint.

In another example embodiment, the measurement estimate and gain module 122 may initiate operating configuration adjustments at the intelligent powered load 104 in response to a need to change the operating configuration of the adaptive power converter 102. For example, the intelligent powered load 104 may be experiencing a condition where it needs to reduce load. The measurement estimate and gain module 122 may communicate that need to the intelligent powered load 104 (e.g., via a CS state correction instruction), which can then adjust its power consumption accordingly (for example, by intelligently adjusting to shed load). In one embodiment, the measurement estimate and gain module 122 may receive an indication that the adaptive power converter 102 needs to reduce power output through PC state correction information received from the power converter state detection and correction function 124. For example, state information for the adaptive power converter 102 may indicate that the adaptive power converter 102 is generating excessive heat or that ambient temperatures around the adaptive power converter 102 are rising to a point that is inhibiting the adaptive power converter 102 from dissipating heat to its surrounding environment. The measurement estimate and gain module 122 may evaluate that power converter state information and generate a CS state correction to the intelligent powered load 104 to take steps to lower its power consumption.

In the embodiment shown in FIG. 1, the measurement estimate and gain module 122 is coupled to the communication module 126, and through the communication module 126, establishes local or cross-system information transmission with other systems. For example, in one embodiment, the communication module 126 may comprise a network interface to establish a communication channel with a network 150 (which may comprise, for example, a local wired or wireless network, or a DAS network). In one or more embodiments, the communication module 126 may establish alternate communications channels with the intelligent powered load 104. For example, in some embodiments, the intelligent powered load 104 may communicate with the measurement estimate and gain module 122 through a direct channel 154 established with the communication module 126 (for example, via a point-to-point wired or wireless connection). In some embodiments, CS state detection and CS state correction information may be communicated via the channel 154. In other embodiments, the intelligent powered load 104 may communicate with the measurement estimate and gain module 122 through a network channel 156 established via the network 150. In other embodiments, other networked elements 152 can be informed about the current state of the adaptive power converter 102 or the intelligent powered load 104 as well. Such network elements can comprise any sort of device that is able to process information, such as computers and servers. In some embodiments, the networked element 152 in communication with the measurement estimate and gain module 122 may be an operating or maintenance system associated with the intelligent powered load 104, such as operator control and status panels. The measurement estimate and gain module 122 may therefore send operating conditions, alarms, alerts, or other health or status information to an external system via the communication module 126. For example, where the intelligent powered load 104 comprises a DAS, the measurement estimate and gain module 122 may communicate via the network 150 with an operator control panel at networked element 152 for the DAS or with another DAS. In some embodiments, an operator may access functions of the measurement estimate and gain module 122 via the communication module 126 to change the settings, reprogram the software running on the power converter controller 120, or add, delete, or update the regulation profiles 116.

In some embodiments, the measurement estimate and gain module 122 may issue PC state corrections or CS state corrections based on other factors or events external to the system 100, such as based on information received via the communication module 126. For example, the measurement estimate and gain module 122 may receive information or an instruction that an emergency or public safety event has been declared. Based on the information, the measurement estimate and gain module 122 may initiate state corrections for one or both of the adaptive power converter 102 and the intelligent powered load 104 to switch to a profile for emergency operation. For example, the power converter state detection and correction function 124 may switch the non-linear control feedback compensator 114 to use a regulation profile 116 assigned for use during emergency events. Such an emergency use regulation profile may instruct the adaptive power converter 102 to raise power and/or disable protective functions that would interrupt supplying power, even at the cost of a shortened life span (for example, to ensure the continuation of wireless communications coverage to an area). Alternatively, an emergency use regulation profile may instruct the adaptive power converter 102 to reduce or disable power to the intelligent powered load 104 if that load is not deemed an essential load.

In some embodiments, a boost power mechanism may be implemented by the adaptive power converter 102 to momentarily supplement or shunt power. For example, in FIG. 1, the adaptive power converter 102 comprises a boost circuit control function 128 that controls a boost circuit 142 coupled to the power regulation control loop (i.e., the switching power conversion circuit) of the adaptive power converter 102. The boost circuit control function 128 and boost circuit 142 may be inactive during regular operation but activated to mitigate abrupt and large load changes. For example, a sudden large increase in load demand from a powered load 104 might cause a voltage collapse at the output of the adaptive power converter 102. The boost circuit control function 128 may operate the boost circuit 142 to momentarily supplement the output power to support the output voltage. For example, in one embodiment, the boost circuit 142 may implement a momentary bypass of the low-pass filter 112, which will increase the effective voltage output of the adaptive power converter 102. In other embodiments, the boost circuit 142 may comprise one or more electrical energy storage devices (such as a battery or capacitor). The boost circuit control function 128 may control the boost circuit 142 to discharge the stored electrical energy to momentarily increase or support the effective voltage output of the adaptive power converter 102. Conversely, a sudden drop in load demand from a connected load 104 might cause a voltage spike at the output of the adaptive power converter 102. In such circumstances, the boost circuit control function 128 may respond by controlling the boost circuit 142 to absorb or shunt at least part of any excess power output to mitigate the voltage spike. For example, in one embodiment, the boost circuit 142 may be controlled to apply a shunt load to the output of the low-pass filter 112 to absorb and dissipate as heat at least part of the power from the voltage spike. Alternatively, at least part of the power from the voltage spike may be applied to a charging circuit to charge one or more electrical energy storage devices of the boost circuit 142. In some embodiments, the boost circuit control function 128 may control the boost circuit 142 in response to control signals from the power converter state detection and correction function 124. In some embodiments, the boost circuit control function 128 may receive measurement signals direct from physical sensors 136 and control the boost circuit 142 in response to those measurement signals.

In some embodiments, measurement data produced by the physical sensors 136 may be used for other purposes. For example, the physical sensors 136 may measure system or environmental parameters (such as, but not limited to, equipment temperature, ambient temperature, humidity level, vibrations, noise levels, electrical current, voltage, and/or power) that are utilized by measurement estimate and gain module 122 for making operational adjustments. In the case where the sensors 136 detect low ambient temperatures, the system 100 may have thermal margins to increase power dissipation by increasing the output voltage of the adaptive power converter 102, for example. The powered load 104 may take advantage of receiving power at a higher voltage in several ways. For example, where the powered load 104 comprises a DAS, the RF paths of the DAS may operate at higher RF power levels so that increased RF coverage can be provided. As another example, the sensors 136 may comprise sensors that monitor aspects of the mains power. For an implementation where the mains power is supplied by a battery, the battery charge level may be monitored by one of the sensors 136. When measurements from that charge sensor indicate that the battery charge has dropped below a threshold, the adaptive power converter 102 could lower the current drawn by the powered load 104 in order to extend battery life and thus the uptime of the system. This can be realized by lowering the adaptive power converter 102 output supply voltage. For embodiments where the adaptive power converter 102 comprises multiple power supply lines (discussed below with respect to FIG. 2), the current draw may be reduced by switching off power supply lines that supply power to non-essential equipment. For example, power supply lines may be maintained for equipment that supports a minimum operation of a DAS system, while non-essential equipment is de-energized.

In other scenarios applicable to an implementation where the intelligent powered load 104 comprises a DAS, the measurement estimate and gain module 122 may change the regulation profile 116 used by the adaptive power converter 102 according to the operational needs of the DAS.

For example, an intelligent powered load 104 comprising a DAS may be operating under conditions where there is little to no wireless RF traffic in the DAS coverage area (for example, during nightly hours at an office building). This information may be carried in CS state information received by the measurement estimate and gain module 122, which issues a PC state correction to the power converter state detection and correction function 124 to select a regulation profile 116 that in turn reduces the output voltage or other key parameters like the switching frequency of the adaptive power converter 102 so that the intelligent powered load 104 operates in a low-power mode. Additionally, the adaptive power converter 102 would save energy when the switching frequency is reduced as power dissipation at the PC input switch 110 (which can be implemented with a MOSFET-transistor or with multiple such transistors building up the PC input switch 110) would decrease. Switching to a lower power mode when demand for power by the DAS is low would potentially serve to increase the mean time between failures of the entire system. As another example, during emergency or public safety events, the adaptive power converter 102 could enter a full load mode. The measurement estimate and gain module 122 can issue a PC state correction to select a regulation profile 116 that increases the power output voltage, which forces the DAS to operate at a higher RF power level. This would enable authorized staff (for example, police or fire brigade) to communicate with higher communication quality or an extended geographic area through increased RF coverage. Under such an operation, it may be accepted that the life span of the system may be rapidly shortened under these circumstances. As such, the regulation profile 116 may reduce or suspend one or more equipment protection functions of the adaptive power converter 102.

Figure 2:
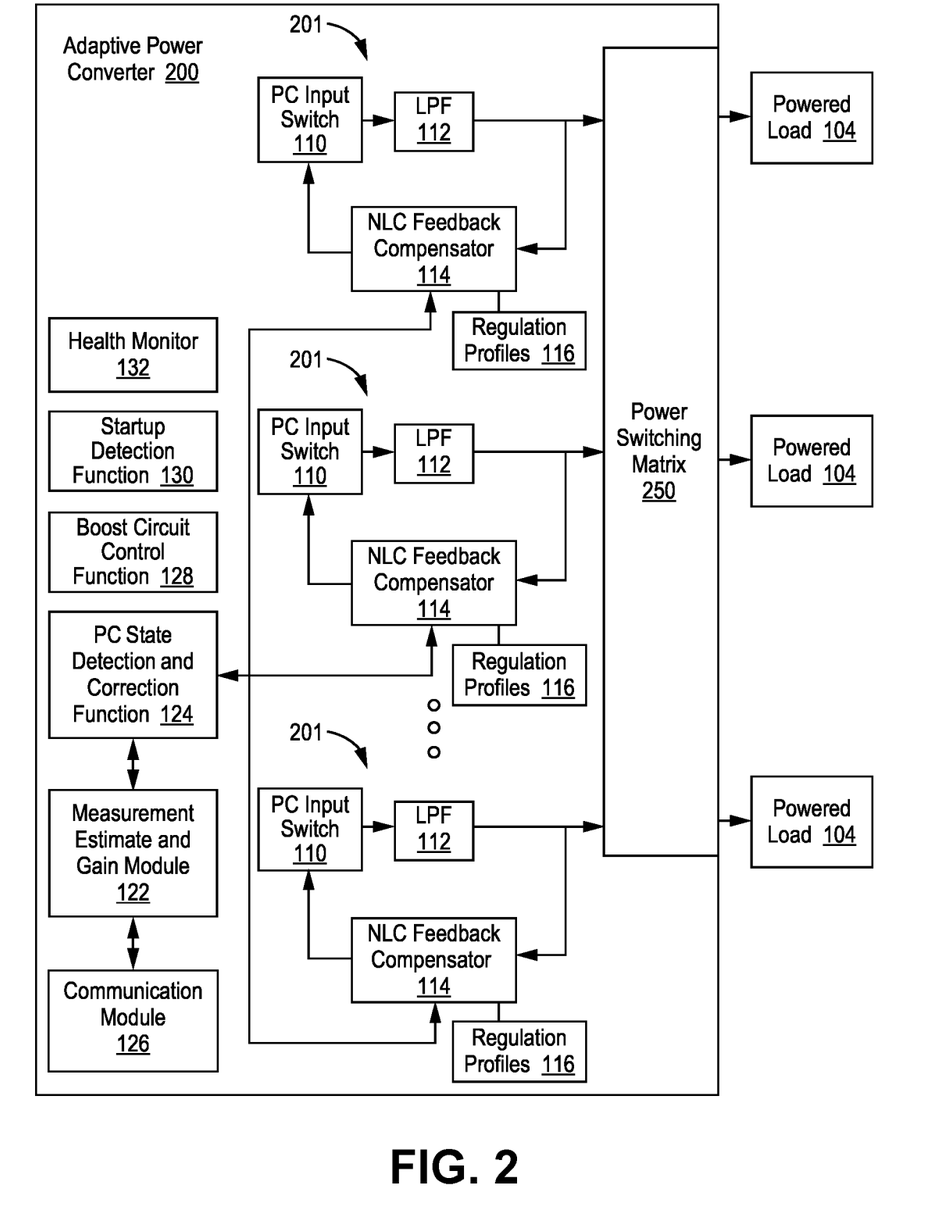
FIG. 2 is a block diagram of an example adaptive power converter embodiment.

In some embodiments, an adaptive power converter 102 may comprise multiple independent power supply lines. Each of the multiple independent power supply lines may be configured to feed a different intelligent powered load 104. For example, in some embodiments, each intelligent powered load 104 comprises a separate DAS. In some embodiments, each separate DAS may implement the same RF standards. In other embodiments, each separate DAS may be implementing different RF standards. An example of one embodiment is illustrated by the adaptive power converter 200 shown in FIG. 2. It should be understood that in various alternate embodiments, the adaptive power converter 200 may comprise any combination of the features described with respect to the adaptive power converter 102 of FIG. 1. For example, the measurement estimate and gain module 122 of adaptive power converter 200 may exchange CS state information with each of the different intelligent powered loads 104 for the same purposes and in the same manners as described with respect to FIG. 1. In FIG. 2, the adaptive power converter 200 comprises a plurality of independent power supply lines 201, each comprising a PC input switch 110, low-pass filter 112, and non-linear control feedback compensator 114 (i.e., a switching power conversion circuit 115) configured to selectively implement one of a plurality of regulation profiles 116 as described above with respect to FIG. 1. Although not shown, it should be understood that the PC input switches 110 for each of the independent power supply lines 201 are coupled to and receive power from a mains power. The measurement estimate and gain module 122 may communicate with other networked elements 152 via network 150 through the communication module 126, as described above.

In the embodiment of FIG. 2, the measurement estimate and gain module 122 is further configured to optionally respond to state information associated with any of the independent power supply lines 201 or any of the connected intelligent powered loads 104 to combine and redistribute the output of the independent power supply lines 201 to dynamically allocate power. In one embodiment, the independent power supply lines 201 each feed their output to a power switching matrix 250 controlled by the measurement estimate and gain module 122. Through the power switching matrix 250, the measurement estimate and gain module 122 can direct the power output from any of the independent power supply lines 201 to any of the connected intelligent powered loads 104, combine the power output from an independent power supply line 201 with any other independent power supply lines 201 to supplement power to any of the connected intelligent powered loads 104, or to disconnect independent power supply lines 201 from any of the connected intelligent powered loads 104.

For example, if one intelligent powered load 104 is temporarily demanding more electric current, the measurement estimate and gain module 122 detects that condition by monitoring state information as described above. The measurement estimate and gain module 122 may evaluate the power demands on the independent power supply line 201 feeding that intelligent powered load 104, identify another of the independent power supply lines 201 that is underutilized, and reconfigure the power switching matrix 250 to combine the outputs of those independent power supply lines 201 to satisfy the increased demand of the intelligent powered load 104 demanding more electric current. Alternatively, both of the independent power supply lines 201 may further be sent state corrections to each select a regulation profile 116 to increase their output voltage, such that the attached intelligent powered load 104 is operating at an increased RF power. Because the selectable regulation profiles 116 for the non-linear control extensions are embedded within the processors implementing the non-linear control feedback compensators 114, the synchronization between different independent power supply line 201 instances can be realized in a fast, robust and flexible way.

It should be noted that for conditions where an intelligent powered load 104 is no longer controllable due to a crashed software program, the adaptive power converter 102 is still able to, to some extent, have control over the intelligent powered load 104. For example, if the measurement estimate and gain module 122 detects a potential crash based on received state information (or a lack thereof) from an intelligent powered load 104, the adaptive power converter 102 could perform a power reset to that intelligent powered load 104, or, alternatively, increase the supply power of the consumer to increase RF power. The measurement estimate and gain module 122 may also send diagnostic information via its communication module 126 to notify an operator about the actual state of an intelligent powered load 104 in cases where the intelligent powered load 104 cannot itself send a status report or communicate an alarm.

As mentioned above, embodiments of the present disclosure may be utilized to implement health monitoring features not available to standard power converters. Health monitoring comprises the detection of abnormal system state conditions within the scope of the adaptive power converter 102 and/or intelligent powered load 104 that would no longer guarantee instant or future normal operation. The detection of abnormal system state conditions may come from immediately recognizable degradations or the collection and statistical analysis of long-term state condition data. Such state conditions may be monitored by the measurement estimate and gain module 122 through PC state detection and CS state detection discussed above. Long-term data derived from both sources of state information can provide indications of operational irregularities and may be evaluated through comparison to component aging profiles, via statistical evaluation, or using Artificial Intelligence (AI) methods. With knowledge of these conditions, the measurement estimate and gain module 122 can perform appropriate actions in order to mitigate the effects or consequences. The measurement estimate and gain module 122 can thus effectuate an early warning system that detects degrading components before failure so that system maintenance may be scheduled in a manner that minimizes unplanned downtimes. In other embodiments, the measurement estimate and gain module 122 can respond to degrading component health indications by changing the regulating scheme of the adaptive power converter 102 and/or the operating mode of the intelligent powered load 104, with the aim of pushing a failure as far into the future as possible, or at least to the next pre-scheduled maintenance. For example, the measurement estimate and gain module 122 can initiate a power converter state correction to select a new regulation profile 116 to reduce output power in order to reduce power dissipation and thus increase the lifetime of electronic or mechanical components.

One basic example of utilizing state information anomalies to address potential system health threats involves adaptive overload mitigation. For example, the adaptive power converter 102 may be experiencing an overload condition. Overload conditions can occur, for example, due to excessive temperature conditions at the adaptive power converter 102 (which may be indicated in the power converter state information measured by sensors 136) or at the intelligent powered load 104 (which may be indicated in the received consumer system state information). The measurement estimate and gain module 122 can respond to this state information by initiating actions to mitigate the potential effects of the excessive temperature conditions. For example, the measurement estimate and gain module 122 can output state corrections to select a regulation profile 116 that will lower certain supply parameters (for example, output voltage magnitude), increase certain other supply parameters (for example, voltage ripple magnitude to reduce switching cycle frequency), reduce the power consumption by the intelligent powered loads 104, or reduce the power dissipation at the adaptive power converter 102. With such a response, the intelligent powered load 104 may continue to operate even if experiencing reduced capacity or capabilities. The adaptive power converter 102 may then re-select the initial regulation profile 116 to return to regular operation (for example, when the state information indicates that normal operation is acceptable). In some embodiments, the adaptive power converter 102 may forward temperature information and/or CS state corrections to an intelligent powered load 104 so that the intelligent powered load 104 can reduce its power demand. This may serve to reduce the burden of the adaptive power converter 102, such that the temperature measurement returns to acceptable values. In other embodiments, the measurement estimate and gain module 122 can output other state corrections to mitigate temperature overload conditions. For example, the measurement estimate and gain module 122 can instruct either the adaptive power converter 102 and/or the intelligent powered load 104 to increase active cooling, for example, by turning on fans or increasing fan rotation speeds. In some embodiments, fan control may be combined with decreasing the power consumption of the intelligent powered load 104. In the case where the overload condition is caused by a high current demand by the intelligent powered load 104 (or by the adaptive power converter 102 itself), any of these actions may also be implemented by the measurement estimate and gain module 122 to either increase cooling or decrease the needed power output level. In some embodiments, if measures taken do not resolve the issue, the measurement estimate and gain module 122 can classify the event as a system fault, and other network elements can be notified by an alarm signal via the communication module 126.

In another scenario, the measurement estimate and gain module 122 may detect gradual parameter drifts in the monitored state information that may indicate electronic component damage or degradation. The parameter drift may occur due to component aging that becomes more prevalent when the system is operating in abnormal situations over time (for example, under conditions such as high static load, high temperature, high load fluctuations). For example, broken inductors, leaky capacitors, or other electronic components within the adaptive power converter 102 can be detected by observing changes in operational characteristics of the adaptive power converter 102 that will eventually cause the system to become out-of-specification if not corrected. As another example, measurement estimate and gain module 122 is configured to detect (e.g., through state information) an increase in a transition time of the input switch 110. An increase in the on-state resistance of the switching transistor, for example, would induce switching delays. The switching delays would have a substantial negative effect on the capability of the adaptive power converter 102 to implement the selected regulation profile 116 and provide a properly stabilized energy supply to the intelligent powered load 104. In both cases, once the degradations are detected, measurement estimate and gain module 122 can communicate state corrections to control parameters of the adaptive power converter 102 and/or the intelligent powered load 104. For example, the regulation profile 116 may be changed to increase or decrease switching frequency or increase control gain (for example, through a higher gate-source voltage at the switching transistor). In addition, operating and/or service personnel can be notified via the communication module 126 to schedule maintenance for a prompt replacement of the degraded component.

For purposes of monitoring health, the power converter controller 120 may further comprise and execute a health monitor function 132 that includes algorithms for estimating the health of the adaptive power converter 102 and/or the intelligent powered load 104. In some embodiments, the health monitor function 132 may execute one or more algorithms that implement filter tracking, statistical methods, or methods of artificial intelligence that determine whether the adaptive reconfiguration realized by selecting a regulation profile 116 (or other corrective function) results in sufficient mitigation to a change in operating conditions, or if a system health issue exists. As such, in some embodiments, the measurement estimate and gain module 122 further receives this information from the health monitor function 132.

In one embodiment, the health monitor function 132 comprises calibration data 134 that may be referenced to confirm equipment health or identify equipment that may be degrading. The calibration data 134 may comprise baseline or other reference data that characterizes expected performance characteristics of system components. The calibration data 134 can be recorded at the factory during a calibration process or during other situations validated as reference events. This reference set of calibration data 134 is stored in a non-transient memory of the power converter controller 120 and accessible to the health monitor function 132. In operation, the health monitor function 132 can compare the calibration data 134 against real-time measurements during the operational lifetime of the system 100 to detect any abnormal deviations in the real-time measurements from the calibration data 134. This would indicate any type of degradation compared to the factory or reference condition.

A startup self-check is one example of a method for realizing health checking. In one embodiment, the health monitor function 132 implements an adaptive power converter 102 startup self-check process that is initiated when the startup detection function 130 detects that the power converter controller 120 has initiated a boot-up protocol. In order to exclude potential influences of any external loads connected to the output of the adaptive power converter 102 on the startup self-check that could result in an incorrect analysis result, the external load is operationally disconnected. An external load may be operationally disconnected in alternate ways. For example, the health monitor function 132 may operate the PC Output Switch 138 to electrically or mechanically disconnect the external load from the output of the adaptive power converter 102. Alternatively, the health monitor function 132 may send a test initiation signal to the measurement estimate and gain module 122, and the measurement estimate and gain module 122 responds by controlling the non-linear control feedback compensator 114 to drive the output voltage down to a level where the external load is not operable and not drawing, or drawing negligible, current. For example, the regulation profiles 116 may comprise a testing profile that the non-linear control feedback compensator 114 loads to drive down the output voltage to a predetermined level.

The output of the adaptive power converter 102 is then tested with one or more calibrated test loads electrically applied to its output. For example, in one embodiment, the adaptive power converter 102 comprises a load array 140 that comprises a plurality of loads that may be selectively applied to the output generated from the low-pass filter 112 to simulate a plurality of loading profiles. In some embodiments, the load array 140 comprises replaceable load modules (which may comprise resistive, capacitive, or inductive loads, or combinations thereof) that can be reconfigured to introduce new loading profiles. The load array 140 is controllable by the health monitor function 132 to apply specified load profiles depending on the test being performed. For example, the load array 140 can be activated with the switch 138 disconnecting any load 104 (i.e., switch 138 being open), but in some embodiments, the load array 140 can apply load profiles during operation when the switch 138 is closed and external loads 104 are connected. In one embodiment, the startup self-check is performed in a static manner, with a load profile being applied by the load array 140 and the output evaluated after a settling time. The static load test checks can be repeated at different output voltage levels to evaluate the static behavior of the adaptive power converter 102 at different voltage setpoints. In another embodiment, the startup self-check is performed in a dynamic manner, where the load profile applied by the load array 140 is quickly changed between different profiles. This dynamic load test may be used for the detection of a 'robustness decrease' of the adaptive power converter 102 control loop, as oscillatory or delaying effects would fade in the case of any degradations or defects.

In one embodiment, the startup self-check comprises computations of an analytic set of system equations that calculate parameters such as a reference output voltage ripple magnitude, switching frequency, or 'ON'-resistance of the input switch 110 switching transistor for a fixed operational point. Alternatively or additionally, the health monitor function 132 may calculate another appropriate derived quantity, such as a frequency response analysis or RF power analysis, to provide a reference measure. In some embodiments, actual values of the output voltage ripple magnitude, switching frequency, or the 'ON'-resistance of the input switch 110 switching transistor is measured by the physical sensors 136. In that case, alternatively or additionally, quantities such as frequency response or RF power are calculated to provide a measure of the actual condition of the adaptive power converter 102. Any significant deviation between the reference and actual value (e.g., greater than a pre-defined threshold) may be identified by the health monitor function 132 as anomalies that can trigger notifications to system operators or maintenance planners and/or mitigated during operation after the startup process has been completed. Once the startup self-check process is completed, if no serious anomalies are identified, normal operation of the adaptive power converter 102 may commence. Serious anomalies could include any condition that indicates that proceeding to operating voltage levels could result in irreparable equipment damage to either the adaptive power converter 102 or any loads fed from the adaptive power converter 102 and/or the potential for physical harm to any persons who could be in the vicinity of that equipment. For instance, a serious anomaly can happen if the input switch 110 is short-circuited so that the full input mains power energy is directly forwarded to the output power of the adaptive power converter 102. Accordingly, if serious anomalies are identified by the startup self-check process, health monitor function 132 outputs a shutdown signal to the measurement estimate and gain module 122. The measurement estimate and gain module 122 keeps the adaptive power converter 102 at a shutdown level and may generate an alert.

It should be noted that there are different variants of how the mains power is considered during a startup self-check process. For example, in one embodiment, the mains input power is disregarded for the purpose of the startup self-check process. This might be useful for environments that provide more or less stable voltage conditions, for example, where the mains power is supported by a stabilized uninterruptible power supply (UPS) voltage. In environments where the mains power is not stable but is instead a highly varying energy supply, the startup self-check will likely produce inaccurate results if used directly. In these situations, it would be useful to also measure the mains power input voltage (or other quantities by the physical sensor module) to be considered in subsequent calculations for improved estimation accuracy.

Another startup self-checking process may be performed to determine a starting point of the startup detection function 130. For this process, the adaptive power converter 102 gradually changes its output voltage according to a pre-defined transient current profile. In turn, the transient current profile drawn by the consumer is estimated by the health monitor function 132 based on knowledge of adaptive power converter 102 state information (for example, transistor switching point intervals) or an intelligent powered load 104's radiated RF power specification. The health monitor function 132 may monitor for any unexpected state information deviations that may potentially indicate a beginning or existing failure condition (e.g., component aging or other degradation or short-circuit on the consumer side). This startup self-checking procedure can be regarded as a load-oriented check, whereas the previously discussed startup self-checking procedure can be considered as an adaptive power converter-oriented health check, so both procedures define components of a two-stage checking process.

After startup, a variety of operational health check processes may be performed by the health monitor function 132 for checking the health of the adaptive power converter 102 and/or the intelligent powered load 104 during regular operation.

In one embodiment of an operational health check process, the operation of the load 104 powered by the adaptive power converter 102 is not affected. In one such operational health check process, for example, measurements of output voltage ripple from the adaptive power converter 102 (which, for example, can be simply accomplished by measuring the temporal order of the switching points of the power converter state detection and correction function 124) may be utilized as an indirect measure of the current drawn by the powered load 104 and is continuously monitored and logged. The process further comprises creating a load profile of the output voltage ripple that can be correlated with other measured data (for example, such as radiated RF power) and evaluated by the health monitor function 132 using statistical methods such that assessments can be drawn about the consumer health or operating conditions that can lead to adaptive actions described before. For example, in one embodiment, the intelligent powered load 104 comprises a DAS operating under conditions of high RF traffic, where multiple power amplifiers are producing RF output. In that case, the health monitor function 132 compares the collected load profile for the high-load condition to previously collected load profiles for relatively low-load conditions can be compared to situations with low RF traffic and statistically determine if the high-load condition load profile reveals indicators of equipment degradation not perceivable from the low-load condition load profile.

Another operational health check process that does not adversely affect the operation of the powered load 104 powered by the adaptive power converter 102 may comprise measuring a switching point signal as represented by state information in PC state detection and correction function 124 over time during dedicated consumer states (mostly stationary states) and performing a Fourier transformation or other algorithm on that data to decompose the signal into its harmonics. For example, constant harmonics would reflect balanced load or mains input power variations. On the other hand, the presence of varying harmonics would indicate an increased transient load variation caused by the consumer or mains input power supply element (e.g., urban power distribution network).

Other operational health check processes may be initiated by the health monitor function 132 that affects the operation of the powered load 104. For example, an operational health check process may include steps that turn off RF output from the powered load 104 to establish reproducible and comparable starting conditions. This way, a load profile can be created and logged for online-processing or offline-processing by auto-correlating the load profile with a pre-defined reference profile or by applying other statistical or artificial intelligence methods that utilize training data. Significant deviations may indicate a beginning anomaly of certain components of subcomponents of the connected load, like optical modules, RF power amplifiers, or other components drifting out of the specified range.

In another operational health check process, the adaptive power converter 102 is controlled by the health monitor function 132 to abruptly or smoothly change between regulation profiles to vary output voltage for a prespecified duration of time while the behavior of the powered load 104 is monitored (for example, a settling time of an RF amplifier). This operational health check process affects the powered load 104's operation but provides insight into the transient processes of power components, such as components that are responsible for the power consumption, for example. In this context, it should be noted that utilizing regulation profiles 116 having fast and robust controlling schemes would be advantageous in order not to harm either the adaptive power converter 102's or powered load 104's circuitry due to oscillatory or over-/undershooting phenomena. For example, if it is desired to instantaneously change the output voltage of the adaptive power converter 102 to a maximum allowed by the powered load 104's power supply voltage rating, over-/undershooting should be kept minimal as over-/undershooting may be harmful to the powered load 104's circuit. Moreover, if an unstable and oscillating adaptive power converter 102 would forward this situation to an attached load such that the load itself would start to oscillate as well, this would be fed back to the adaptive power converter 102, and an undesirable resonance case could arise.

Figure 3:
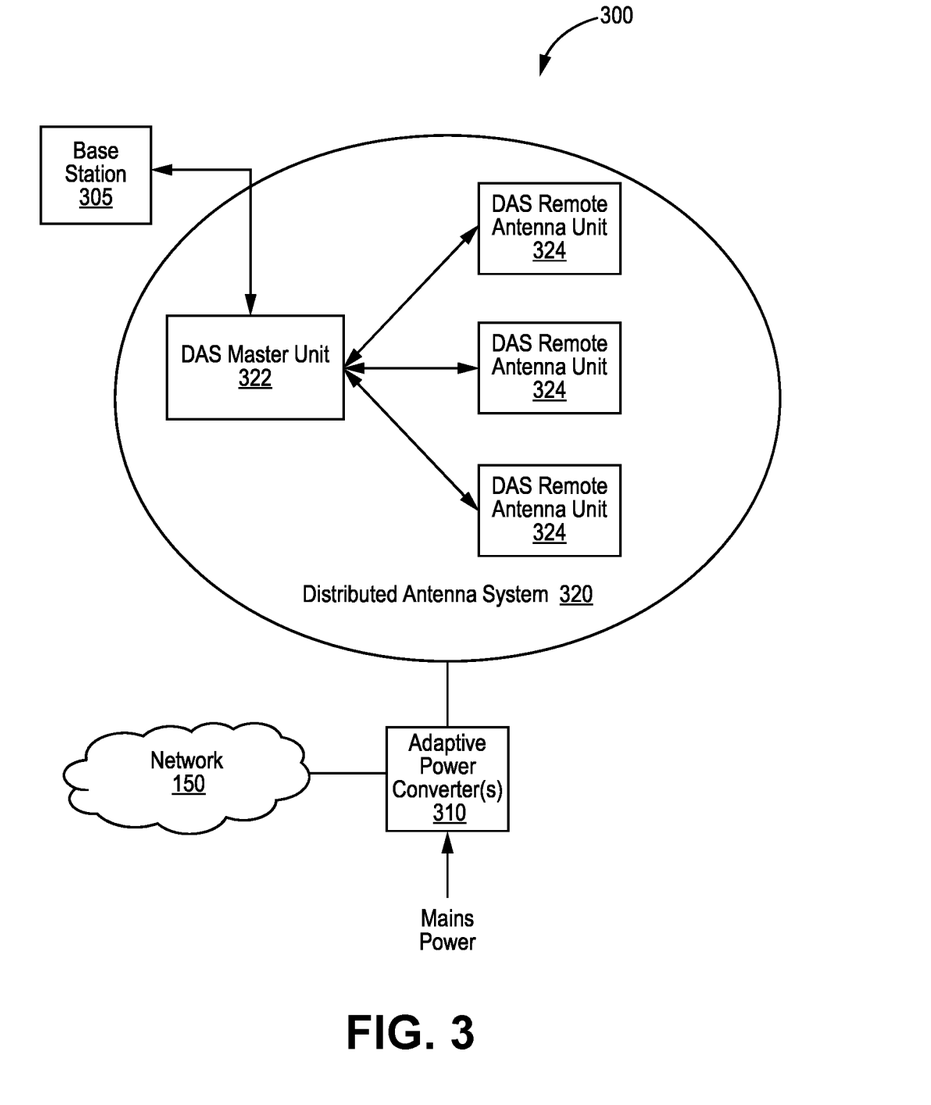
FIG. 3 is a block diagram of an example distributed antenna system embodiment.

FIG. 3 is a diagram illustrating at 300 a distributed antenna system (DAS) 320 coupled to an output of at least one adaptive power converter 310. The adaptive power converter 310 may be implemented using any variation of the adaptive power converters 102 and 200 described throughout this disclosure. The DAS 320 defines an intelligent powered load 104, as described throughout this disclosure. As such, features of embodiments previously described where the intelligent powered load 104 comprises a distributed antenna system are applicable to this embodiment of FIG. 3 and the interactions between the at least one adaptive power converter 310 and the DAS 320. In this embodiment, the DAS 320 comprises a master unit 322 and a plurality of remote antenna units 324, wherein the master unit 322 is coupled to a base station 305. The plurality of remote antenna units 324 are communicatively coupled to the master unit 322 by respective communications links. The DAS 320 operates to extend wireless connectivity services provided by the base station 305 into a coverage area. Accordingly, each of the remote antenna units 324 comprise RF transmitter and receiver circuitry for communicating with mobile user equipment within the coverage area of the DAS 320. In the example embodiment shown in FIG. 3, the adaptive power converter 310 supplies electric power for operating the RF transmitter and receiver circuitry for one or more of the remote antenna units 324 and may further power other DAS circuitry within the remote antenna units 324. The adaptive power converter 310 may further power other DAS circuitry within the master unit 322. In each variant, the adaptive power converter 310 communicates consumer system state information with the master unit and/or remote antenna units to regulate its output and perform health monitoring as described in any of the example embodiments disclosed herein. In some embodiments, the adaptive power converter 102 may be a component integrated within the master unit 322 or a remote antenna unit 324, or other component of the DAS 320. In such embodiments, the consumer system state information may be communicated with the measurement estimate and gain module 122 of the adaptive power converter 310 via an operations or maintenance channel of the DAS 320. As illustrated, the adaptive power converter 310 is connected to a network 150. The network 150 may be connected to other adaptive power converters 310, which may likewise be connected to other DAS(s) 320. Further, the different power converters 310 may be supplied by a common mains power and may be separated by a substantial distance, though connected to each other by a communication channel through the network 150.

Figure 4:
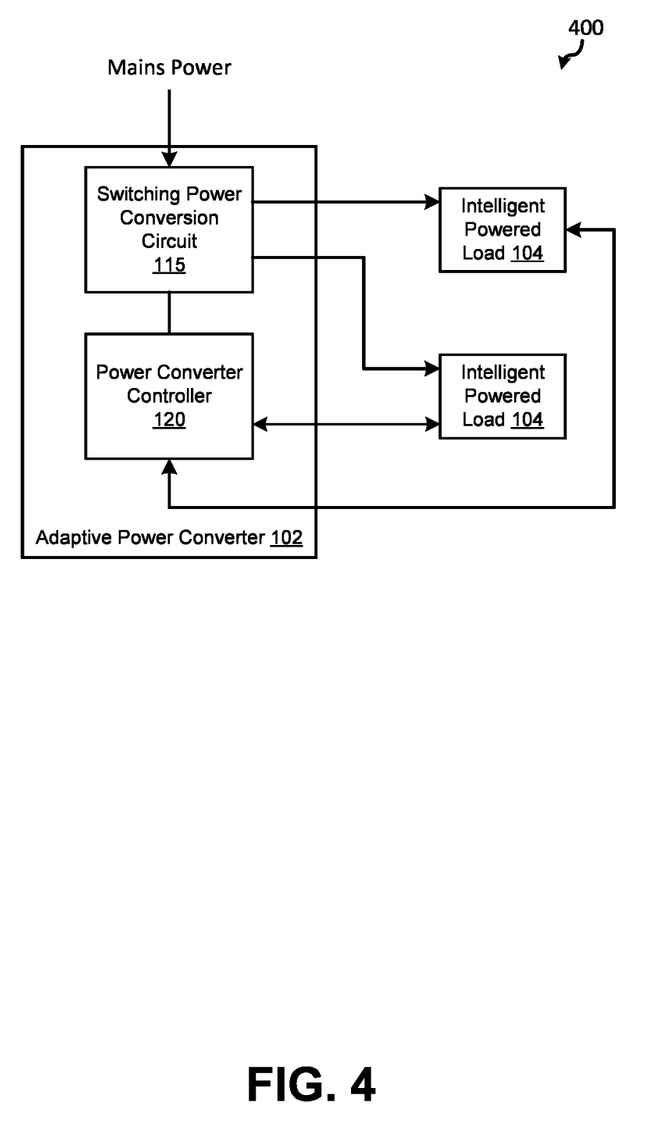
FIG. 4 is a block diagram of an example power distribution system embodiment.

FIG. 4 is a block diagram illustrating a power distribution system 400 comprising an example adaptive power converter 102 coupled to an adaptive power consumer system which includes the intelligent powered loads 104. The adaptive power converter 102 includes a switching power conversion circuit 115 and a power converter controller 120. The switching power conversion circuit 115 and power converter controller 120 function substantially as described above in connection with FIGS. 1-3. Similarly, the Intelligent powered loads 104 function substantially as described above in connection with FIGS. 1-3.

In certain embodiments, during operation of the intelligent powered loads 104, an intelligent powered load 104 determines and generates status information that represents its respective power needs. For example, as discussed above, when an intelligent powered load 104 includes a DAS, the intelligent powered load 104 may be operating under conditions where there is little to no wireless RF traffic in the DAS coverage area. The intelligent powered load 104 may identify the associated power needs based on the operating conditions and generate status information (also referred to as consumer system state information). The intelligent powered load 104 may then send the status information indicating that it can operate in a low-power mode to the adaptive power converter 102. In a similar example, the intelligent powered load 104 may determine that it needs to operate in a full load mode and send associated status information indicating power needs associated with a full load mode. The intelligent powered load 104 may identify other power needs based on the operating conditions of the intelligent powered load 104.

As described above, a power converter controller 120 in the adaptive power converter 102 receives the status information from the intelligent powered loads 104 and determines a level of power to provide to the intelligent powered loads 104 based on the status information. The power converter controller 120 then controls a switching power conversion circuit 115 in the adaptive power converter 102 to provide power to the intelligent powered load associated with the status information at the determined power level.

Accordingly, the switching power conversion circuit 115 provides the power to the intelligent powered load 104 at the determined power level. Thus, the intelligent powered load 104 is able to identify its power needs and communicate them to the adaptive power converter 102, which responds by determining an associated power level and providing power to the intelligent powered load 104 at a power level that meets the identified power needs.

In additional embodiments, the intelligent powered load 104 may send information other than power needs to the adaptive power converter 102. For example, the intelligent powered load 104 may send information indicating an RF standard implemented by the intelligent powered load 104, how many communication channels are being used, or other information describing the operation of the intelligent powered load 104 that may reflect the power needs of the intelligent powered load. To communicate the status information to the adaptive power converter 102, the intelligent powered load 104 may communicate through either a direct channel or through a network channel as described above. Further, the power converter controller 120 may identify operating conditions that affect the operation of the intelligent powered load 104 from the status information received from the intelligent powered load 104, from status information received from other intelligent powered loads 104, from the operation of the adaptive power converter 102, and from power provided to the adaptive power converter 102 by the mains power. From the multiple sources of information, the power converter controller 120 may determine that the operation of the intelligent power load 104 should change to reflect the power that the adaptive power converter 102 provides to the intelligent power load 104. Accordingly, the power converter controller 120 may send a correction instruction to the intelligent powered load 104. Upon receiving the correction instruction, the intelligent powered load 104 may change operations to align with the power provided by the adaptive power converter 102.

EXAMPLE EMBODIMENTS

Example 1 includes an adaptive power converter, the adaptive power converter comprising: a power converter controller; a switching power conversion circuit comprising an input switch, a low-pass filter, and a non-linear control feedback compensator executed by the power converter controller, wherein the input switch is controlled using feedback control from the non-linear control feedback compensator, wherein the non-linear control feedback compensator controls the input switch to regulate an output from the switching power conversion circuit based on a plurality of regulation profiles; a measurement estimate and gain module executed by the power converter controller; and a power converter state detection and correction function executed by the power converter controller; wherein the measurement estimate and gain module is configured to evaluate power converter state information from the power converter state detection and correction function; and wherein based on the power converter state information, the measurement estimate and gain module controls the non-linear control feedback compensator to select a first regulation profile from the plurality of regulation profiles, wherein the non-linear control feedback compensator applies the first regulation profile for regulating the output from the switching power conversion circuit.

Example 2 includes the adaptive power converter of Example 1, wherein the output from the switching power conversion circuit is coupled to an intelligent powered load; wherein the measurement estimate and gain module is configured to communicate consumer system state information with the intelligent powered load; and wherein the measurement estimate and gain module controls the non-linear control feedback compensator based on a combination of the power converter state information and the consumer system state information.

Example 3 includes the adaptive power converter of Example 2, wherein the measurement estimate and gain module is configured to initiate operating configuration adjustments of the intelligent powered load based on the combination of the power converter state information and the consumer system state information.

Example 4 includes the adaptive power converter of any of Examples 1-3, further comprising: a communication module comprising a network interface configured to couple to a network, wherein the measurement estimate and gain module is configured to communicate with at least one networked element via the communication module.

Example 5 includes the adaptive power converter of Example 4, wherein the at least one networked element comprises an operator control panel associated with an intelligent powered load coupled to the output from the switching power conversion circuit.

Example 6 includes the adaptive power converter of any of Examples 4-5, wherein the measurement estimate and gain module communicates consumer system state information with an intelligent powered load via the communication module.

Example 7 includes the adaptive power converter of any of Examples 1-6, wherein the non-linear control feedback compensator monitors a output voltage signal from the low-pass filter and controls power converter input switch to regulate the output voltage signal based on non-linear control extensions defined by the first regulation profile.

Example 8 includes the adaptive power converter of any of Examples 1-7, wherein the plurality of regulation profiles comprises at least one emergency use regulation profile that causes the switching power conversion circuit to either raise power or disable protective functions that interrupt supplying power.

Example 9 includes the adaptive power converter of any of Examples 1-8, further comprising a boost circuit control function that controls a boost circuit coupled to the switching power conversion circuit; wherein the boost circuit control function is configured to operate the boost circuit to momentarily supplement the output to support an output voltage in response to detecting an increase in load demand on the output from the switching power conversion circuit; and wherein the boost circuit control function is configured to operate the boost circuit to shunt at least part of an excess power output in response to detecting a voltage spike on the output from the switching power conversion circuit Example 10 includes the adaptive power converter of Example 9, wherein the boost circuit comprises an one or more electrical energy storage devices.

Example 11 includes the adaptive power converter of any of Examples 1-10, further comprising one or more physical sensors configured to measure system or environmental parameters, where the measurement estimate and gain module is configured to initiate adjustments based on the system or environmental parameters.

Example 12 includes the adaptive power converter of any of Examples 1-11, further comprising a health monitor function executed by the power converter controller, wherein the health monitor function includes algorithms for estimating a health of the adaptive power converter.

Example 13 includes the adaptive power converter of Example 12, wherein the health monitor function includes algorithms for estimating the health of an intelligent powered load coupled to the output of the switching power conversion circuit.

Example 14 includes the adaptive power converter of any of Examples 12-13, wherein the health monitor function includes at least a first algorithm for performing a startup self-check process, and at least a second algorithm for performing an operational health check process during regular operation.

Example 15 includes the adaptive power converter of Example 14, wherein the startup self-check process comprises operationally disconnecting a load from the output of the switching power conversion circuit during the startup self-check process.

Example 16 includes the adaptive power converter of any of Examples 12-15, wherein the health monitor function is configured to compare measurements against calibration data to detect degradations, wherein the calibration data is stored in a non-transient memory of the power converter controller.

Example 17 includes the adaptive power converter of any of Examples 1-16, further comprising a plurality of switching power conversion circuits each providing a respective output; wherein based on the power converter state information, the measurement estimate and gain module controls a respective non-linear control feedback compensator of each of the plurality of switching power conversion circuits to select a respective regulation profile from the plurality of regulation profiles for regulating the respective output from each of the plurality of switching power conversion circuits.

Example 18 includes the adaptive power converter of Example 17, further comprising a power switching matrix controlled by the measurement estimate and gain module; wherein the measurement estimate and gain module is configured to control power switching matrix to direct the respective output from each of the plurality of switching power conversion circuits between a plurality of external loads.

Example 19 includes a method for an adaptive power converter, the method comprising: producing an electrical power output from a switching power conversion circuit of the adaptive power converter, the switching power conversion circuit comprising input switch, a low-pass filter, and a non-linear control feedback compensator executed by a power converter controller; evaluating, with the power converter controller, power converter state information associated with the adaptive power converter; and controlling the non-linear feedback compensator, based on evaluating the power converter state information, to select a regulation profile from a plurality of regulation profiles, wherein the non-linear control feedback compensator applies the regulation profile to regulate an output from the switching power conversion circuit.

Example 20 includes the method of Example 19, wherein the output from the switching power conversion circuit is coupled to an intelligent powered load, the method further comprising: receiving consumer system state information associated with the intelligent powered load; and controlling the non-linear control feedback compensator, based on evaluating a combination of the power converter state information and the consumer system state information, to select the regulation profile from the plurality of regulation profiles.

Example 21 includes the method of any of Examples 19-20, further comprising: executing one or more algorithms for estimating a health of the adaptive power converter, wherein the one or more algorithms include at least a first algorithm for performing a startup self-check process, and at least a second algorithm for performing an operational health check process during regular operation.

Example 22 includes a distributed antenna system, the distributed antenna system comprising: a master unit configured to couple to a base station; a plurality of remote antenna units communicatively coupled to the master unit, wherein the plurality of remote antenna units comprise radio frequency (RF) transmitter and receiver circuitry for wirelessly communicating with mobile user equipment within a coverage area; and at least one adaptive power converter of any of Examples 1-18, wherein the at least one adaptive power converter regulates power to at least one of the master unit or the plurality of remote antenna units based on consumer system state information associated with the master unit or the plurality of remote antenna units.

Example 23 includes the distributed antenna system of Example 22, wherein the consumer system state information is communicated to the at least one adaptive power converter over an operations or maintenance channel of the distributed antenna system.

Example 24 includes a power distribution system, the power distribution system comprising: one or more intelligent powered loads configured to determine and generate status information representing a power need of the one or more intelligent powered loads; and an adaptive power converter, wherein the adaptive power converter comprises: a switching power conversion circuit configured to provide power to the one or more intelligent powered loads; and a power converter controller configured to control the power provided by the switching power conversion circuit, wherein the power converter controller receives the status information from the one or more intelligent powered loads and determines a level of the power to provide to the one or more intelligent powered loads based on the status information; wherein, the switching power conversion circuit provides the power to the one or more intelligent powered loads at the determined level.

Example 25 includes the power distribution system of Example 24, wherein the status information indicates that the one or more intelligent powered loads are operating in at least one of: a full load mode; and a low-power mode.

Example 26 includes the power distribution system of any of Examples 24-25, wherein the power converter controller is further configured to send a correction instruction to the one or more intelligent powered loads, wherein the one or more intelligent powered loads changes operation of the one or more intelligent powered loads based on the correction instruction.

Example 27 includes the power distribution system of any of Examples 24-26, wherein the adaptive power converter communicates with the one or more power loads through at least one of: a direct channel; and a network channel.

Example 28 includes the power distribution system of Example 27, wherein the adaptive power converter communicates with another adaptive power converter through the network channel.

Example 29 includes the power distribution system of any of Examples 24-28, wherein the one or more intelligent powered loads comprises a plurality of distributed antenna systems, and one or more distributed antenna systems in the plurality of distributed antenna systems includes an implemented radio frequency standard as part of the status information provided to the power converter controller.

In various alternative embodiments, system and/or device elements, method steps, or example implementations described throughout this disclosure (such as any of the adaptive power converter, power converter controller, network, connected load, non-linear control feedback compensator, PC state detection and correction function, boost circuit control function, startup detection function, health monitor function, measurement estimate and gain module, communication module, base station, master unit, remote antenna unit, or any controllers, circuits, or sub-parts thereof, for example) may be implemented at least in part using one or more computer systems, field programmable gate arrays (FPGAs), or similar devices comprising a processor coupled to a memory and executing code to realize those elements, processes, examples, or said code stored on a non-transient hardware data storage device. Therefore, other embodiments of the present disclosure may include elements comprising program instructions resident on computer-readable media, which, when implemented by such computer systems, enable them to implement the embodiments described herein. As used herein, the term "computer-readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to, computer-executable instructions executed by computer system processors and hardware description languages such as Very High Speed Integrated Circuit (VHSIC) Hardware Description Language (VHDL).

As used herein, DAS and network related terms such as "controller", "converter", "network interface" "network", "connected load", "mains power", "circuit", "filter", "switch", "processor", "memory", "master unit", "base station", and "remote antenna unit", refer to hardware elements that would be immediately recognized and understood by those of skill in the art of telecommunications and networks and are not used herein as nonce words or nonce terms for the purpose of invoking 35 USC 112(f).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. An adaptive power converter, the adaptive power converter comprising:
    a power converter controller;
    a switching power conversion circuit comprising an input switch, a low-pass filter, and a non-linear control feedback compensator executed by the power converter controller, wherein the input switch is controlled using feedback control from the non-linear control feedback compensator, wherein the non-linear control feedback compensator controls the input switch to regulate an output from the switching power conversion circuit based on a plurality of regulation profiles;
    a measurement estimate and gain module executed by the power converter controller; and
    a power converter state detection and correction function executed by the power converter controller;
    wherein the measurement estimate and gain module is configured to evaluate power converter state information from the power converter state detection and correction function; and
    wherein based on the power converter state information, the measurement estimate and gain module controls the non-linear control feedback compensator to select a first regulation profile from the plurality of regulation profiles, wherein the non-linear control feedback compensator applies the first regulation profile for regulating the output from the switching power conversion circuit.

2. The adaptive power converter of claim 1, wherein the output from the switching power conversion circuit is coupled to an intelligent powered load;
    wherein the measurement estimate and gain module is configured to communicate consumer system state information with the intelligent powered load; and
    wherein the measurement estimate and gain module controls the non-linear control feedback compensator based on a combination of the power converter state information and the consumer system state information.

3. The adaptive power converter of claim 2, wherein the measurement estimate and gain module is configured to initiate operating configuration adjustments of the intelligent powered load based on the combination of the power converter state information and the consumer system state information.

4. The adaptive power converter of claim 1, further comprising:
    a communication module comprising a network interface configured to couple to a network, wherein the measurement estimate and gain module is configured to communicate with at least one networked element via the communication module.

5. The adaptive power converter of claim 4, wherein the at least one networked element comprises an operator control panel associated with an intelligent powered load coupled to the output from the switching power conversion circuit.

6. The adaptive power converter of claim 4, wherein the measurement estimate and gain module communicates consumer system state information with an intelligent powered load via the communication module.

7. The adaptive power converter of claim 1, wherein the non-linear control feedback compensator monitors an output voltage signal from the low-pass filter and controls power converter input switch to regulate the output voltage signal based on non-linear control extensions defined by the first regulation profile.

8. The adaptive power converter of claim 1, wherein the plurality of regulation profiles comprises at least one emergency use regulation profile that causes the switching power conversion circuit to either raise power or disable protective functions that interrupt supplying power.

9. The adaptive power converter of claim 1, further comprising a boost circuit control function that controls a boost circuit coupled to the switching power conversion circuit;
    wherein the boost circuit control function is configured to operate the boost circuit to momentarily supplement the output to support an output voltage in response to detecting an increase in load demand on the output from the switching power conversion circuit; and wherein the boost circuit control function is configured to operate the boost circuit to shunt at least part of an excess power output in response to detecting a voltage spike on the output from the switching power conversion circuit.

10. The adaptive power converter of claim 9, wherein the boost circuit comprises an one or more electrical energy storage devices.

11. The adaptive power converter of claim 1, further comprising one or more physical sensors configured to measure system or environmental parameters, where the measurement estimate and gain module is configured to initiate adjustments based on the system or environmental parameters.

12. The adaptive power converter of claim 1, further comprising a health monitor function executed by the power converter controller, wherein the health monitor function includes algorithms for estimating a health of the adaptive power converter.

13. The adaptive power converter of claim 12, wherein the health monitor function includes algorithms for estimating the health of an intelligent powered load coupled to the output of the switching power conversion circuit.

14. The adaptive power converter of claim 12, wherein the health monitor function includes at least a first algorithm for performing a startup self-check process, and at least a second algorithm for performing an operational health check process during regular operation.

15. The adaptive power converter of claim 14, wherein the startup self-check process comprises operationally disconnecting a load from the output of the switching power conversion circuit during the startup self-check process.

16. The adaptive power converter of claim 12, wherein the health monitor function is configured to compare measurements against calibration data to detect degradations, wherein the calibration data is stored in a non-transient memory of the power converter controller.

17. The adaptive power converter of claim 1, further comprising a plurality of switching power conversion circuits each providing a respective output;
wherein based on the power converter state information, the measurement estimate and gain module controls a respective non-linear control feedback compensator of each of the plurality of switching power conversion circuits to select a respective regulation profile from the plurality of regulation profiles for regulating the respective output from each of the plurality of switching power conversion circuits.

18. The adaptive power converter of claim 17, further comprising a power switching matrix controlled by the measurement estimate and gain module;
wherein the measurement estimate and gain module is configured to control the power switching matrix to direct the respective output from each of the plurality of switching power conversion circuits between a plurality of external loads.

19. A distributed antenna system, the distributed antenna system comprising:
a master unit configured to couple to a base station;
a plurality of remote antenna units communicatively coupled to the master unit, wherein the plurality of remote antenna units comprise radio frequency (RF) transmitter and receiver circuitry for wireless communicating with mobile user equipment within a coverage area; and
at least one adaptive power converter, wherein the at least one adaptive power converter regulates power to at least one of the master unit or the plurality of remote antenna units based on consumer system state information associated with the master unit or the plurality of remote antenna units, wherein an adaptive power converter in the at least one adaptive power converter comprises:
a power converter controller;
a switching power conversion circuit comprising an input switch, a low-pass filter, and a non-linear control feedback compensator executed by the power converter controller, wherein the input switch is controlled using feedback control from the non-linear control feedback compensator, wherein the non-linear control feedback compensator controls the input switch to regulate an output from the switching power conversion circuit based on a plurality of regulation profiles;
a measurement estimate and gain module executed by the power converter controller; and
a power converter state detection and correction function executed by the power converter controller;
wherein the measurement estimate and gain module is configured to evaluate power converter state information from the power converter state detection and correction function; and
wherein based on the power converter state information, the measurement estimate and gain module controls the non-linear control feedback compensator to select a first regulation profile from the plurality of regulation profiles, wherein the non-linear control feedback compensator applies the first regulation profile for regulating the output from the switching power conversion circuit.

20. The distributed antenna system of claim 19, wherein the consumer system state information is communicated to the at least one adaptive power converter over an operations or maintenance channel of the distributed antenna system.

21. A power distribution system, the power distribution system comprising:
one or more intelligent powered loads configured to determine and generate status information representing a power need of the one or more intelligent powered loads; and
an adaptive power converter, wherein the adaptive power converter comprises:
a power converter controller;
a switching power conversion circuit comprising an input switch, a low-pass filter, and a non-linear control feedback compensator executed by the power converter controller, wherein the input switch is controlled using feedback control from the non-linear control feedback compensator, wherein the non-linear control feedback compensator controls the input switch to regulate an output from the switching power conversion circuit based on a plurality of regulation profiles;
a measurement estimate and gain module executed by the power converter controller; and
a power converter state detection and correction function executed by the power converter controller;
wherein the measurement estimate and gain module is configured to evaluate power converter state information from the power converter state detection and correction function;
wherein based on the power converter state information, the measurement estimate and gain module controls the non-linear control feedback compensator to select a first regulation profile from the plurality of regulation profiles, wherein the non-linear control feedback compensator applies the first regulation profile for regulating the output from the switching power conversion circuit;

wherein the switching power conversion circuit is configured to provide power to the one or more intelligent powered loads;

wherein the power converter controller is configured to control the power provided by the switching power conversion circuit, wherein the power converter controller receives the status information from the one or more intelligent powered loads and determines a level of the power to provide to the one or more intelligent powered loads based on the status information; and wherein, the switching power conversion circuit provides the power to the one or more intelligent powered loads at the determined level.

22. The power distribution system of claim 21, wherein the status information indicates that the one or more intelligent powered loads are operating in at least one of:

a full load mode; and a low-power mode.

23. The power distribution system of claim 21, wherein the power converter controller is further configured to send a correction instruction to the one or more intelligent powered loads, wherein the one or more intelligent powered loads changes operation of the one or more intelligent powered loads based on the correction instruction.

24. The power distribution system of claim 21, wherein the adaptive power converter communicates with the one or more power loads through at least one of:

a direct channel; and a network channel.

25. The power distribution system of claim 24, wherein the adaptive power converter communicates with another adaptive power converter through the network channel.

26. The power distribution system of claim 21, wherein the one or more intelligent powered loads comprises a plurality of distributed antenna systems, and one or more distributed antenna systems in the plurality of distributed antenna systems includes an implemented radio frequency standard as part of the status information provided to the power converter controller.

* * * * *